(12) United States Patent
Vollrath et al.

(10) Patent No.: US 10,859,373 B2
(45) Date of Patent: Dec. 8, 2020

(54) METHOD AND MEASURING DEVICE FOR DETERMINING AN ANGLE OF A CORNER

(71) Applicant: Kaleas GmbH & Co. KG, Denzlingen (DE)

(72) Inventors: Thomas Vollrath, Auggen (DE); Daniel Bohler, Denzlingen (DE)

(73) Assignee: Kaleas GmbH & Co. KG, Denzlingen (DE)

( * ) Notice: Subject to any disclaimer, the term of this patent is extended or adjusted under 35 U.S.C. 154(b) by 173 days.

(21) Appl. No.: 16/310,241

(22) PCT Filed: Jun. 6, 2017

(86) PCT No.: PCT/EP2017/063742
§ 371 (c)(1),
(2) Date: Dec. 14, 2018

(87) PCT Pub. No.: WO2017/215982
PCT Pub. Date: Dec. 21, 2017

(65) Prior Publication Data
US 2019/0186908 A1    Jun. 20, 2019

(30) Foreign Application Priority Data
Jun. 14, 2016 (DE) .......................... 10 2016 007 219

(51) Int. Cl.
*G01B 11/26* (2006.01)
*G01C 1/00* (2006.01)
(Continued)

(52) U.S. Cl.
CPC .............. *G01B 11/26* (2013.01); *G01B 15/00* (2013.01); *G01C 1/00* (2013.01); *G01C 3/08* (2013.01); *G01C 15/002* (2013.01)

(58) Field of Classification Search
CPC .................................................... G01B 11/26
(Continued)

(56) References Cited

U.S. PATENT DOCUMENTS 5,631,732 A * 5/1997 Schrum, Jr. .............. G01C 1/02
356/147
2007/0058155 A1    3/2007 Booker, Jr.
(Continued)

FOREIGN PATENT DOCUMENTS

DE          102005004321 A1    8/2006

OTHER PUBLICATIONS

International Search Report dated Oct. 20, 2017 for International Application No. PCT/EP2017/063742 (10 pages).
(Continued)

*Primary Examiner* — George B Bennett
(74) *Attorney, Agent, or Firm* — Tarolli, Sundheim, Covell & Tummino LLP; John A. Yirga, Esq.

(57) ABSTRACT

The invention relates to a method and to a measuring device for determining an angle (W; W10) from measured lengths (L1, L2, L3; L10, L20) and/or angles (α, β) by way of trigonometric conditions. In a first embodiment, it is provided that a minimum length (L1) between a measuring point (P2) and a first wall surface (1), and a minimum length (L2) between the measuring point (P2) and a second wall surface (2), and a length (L3) between the measuring point (P2) and an intersecting point of the first wall surface (1) with the second wall surface (2) are determined from a measurement sequence of individual measurements. Based on these lengths, the required angle (W) between the first wall surface (1) and the second wall surface (2) is determined. In a second embodiment, it is provided that at least two lengths (L10, L20) from a measuring point (P1) to at least two points (A, B) on an inclined surface (10) and the respective associated angles (α, β) between the respective measuring direction and the horizontal (H) are determined. Based on these lengths (L10, L20) and angles (α, β), the angle (W10) between the inclined surface (10) and the horizontal (H) is determined.

20 Claims, 2 Drawing Sheets

(51) Int. Cl.
  *G01C 15/00*  (2006.01)
  *G01C 3/08*  (2006.01)
  *G01B 15/00*  (2006.01)

(58) Field of Classification Search
  USPC .......................................... 33/1 AP, 1 N, 284
  See application file for complete search history.

(56) References Cited

U.S. PATENT DOCUMENTS

| 2016/0035096 | A1* | 2/2016 | Rudow | G01S 19/25 |
| | | | | 348/135 |
| 2016/0069666 | A1* | 3/2016 | Zhang | G01B 11/0608 |
| | | | | 702/158 |
| 2018/0045504 | A1* | 2/2018 | Jiang | G01B 11/14 |
| 2020/0109940 | A1* | 4/2020 | Cattin | G01D 5/28 |
| 2020/0225034 | A1* | 7/2020 | Gould | B23Q 17/2233 |

OTHER PUBLICATIONS

Fluke Corporation: User's Manual 414D, 419D, 424D Laser Distance Meter, Jun. 2012 (40 pages).
International Preliminary Report on Patentability for priority application International Application No. PCT/EP2017/063742 dated Dec. 18, 2018 (5 pages).
International Preliminary Report on Patentability for priority application No. PCT/EP2017/063742 dated Dec. 18, 2018 (10 pages).

* cited by examiner

METHOD AND MEASURING DEVICE FOR DETERMINING AN ANGLE OF A CORNER

CROSS-REFERENCES TO RELATED APPLICATIONS

The present application is a 35 U.S.C. § 371 National Stage Patent Application of International PCT Application Serial No. PCT/EP2017/063742 having an International filing date of 6 Jun. 2017 and that was published on 21 Dec. 2017 under international publication number WO 2017/215982, which claims priority to German Patent Application No. 102016007219.9 filed 14 Jun. 2016. This Application claims priority to and incorporates by reference the above-identified applications in their entirety for all purposes.

BACKGROUND

The present invention relates to a method and to a measuring device for determining an angle, and in particular for determining an angle in a corner (inside corner) between two wall surfaces or an angle between an inclined surface and the horizontal.

PRIOR ART

Usually, an angle, for example on a construction site, is measured by way of a goniometer or a protractor. In particular, systems such as protractors are at times cumbersome to handle and require direct access to the object to be measured. This presents a problem on construction sites or objects located up high, at a larger distance or in inaccessible sites since it is difficult for a user to reach the objects to be measured. Moreover, such an angle measurement approach is often time-consuming and requires expertise on the part of the user.

A method for measuring a length of a path and a device for carrying out the method are known from DE 10 2005 004 321 A1. For this purpose, distances between a measuring point located spaced apart from the path to be measured and the path to be measured are measured using a certain repetition or sampling rate. By way of a min/max function, maximum or minimum lengths are ascertained from the distances thus measured, based on which the length of the line to be measured can be determined. Moreover, this method and/or the device can also be used as a goniometer by calculating an angle with respect to a perpendicular to the line to be measured by way of trigonometric conditions.

OBJECTIVE

It is the object of the present invention to provide a method and a measuring device for determining an angle in certain difficult-to-access areas or measuring situations, which are easy to handle. In particular, it is an object of the invention to provide simple and fast determination of an angle in a corner (inside corner) between two wall surfaces or of an angle between an inclined surface and the horizontal.

According to the invention, this object is achieved by a method for determining an angle having the features of claim 1 or 5, and by a measuring device for determining an angle having the features of claim 3 or 9. Advantageous embodiments are described in the respective dependent claims.

ADVANTAGES OF THE INVENTION

A first embodiment of the method according to the invention for determining an angle is a method for determining an angle W10 between an inclined surface, in particular a roof or landscape surface, and a horizontal, in which individual distance measurements in a measuring plane, which is perpendicular to the inclined surface and the horizontal, are carried out from a measuring point in the measuring plane, wherein a length L10 of a first path from the measuring point to a first point on the inclined surface and its angle $\alpha$ to the horizontal, and a length L20 of a second path from the measuring point to a second point on the inclined surface and its angle $\beta$ to the horizontal in the measuring plane are determined, and wherein the angle W10 is determined based on the length L10 of the first path, the length L20 of the second path, and the associated angles $\alpha$, $\beta$ to the horizontal using trigonometric functions.

The method allows a user to indirectly determine an angle of a surface, which is located at a distance and/or is difficult to access, easily and quickly, i.e. of a roof surface or of landscape surfaces. It suffices to determine two path lengths from a measuring point to two spaced apart (target) points on the inclined surface in the measuring plane, and of the respective angles between the directions of the paths and the horizontal. The desired angle W10 between the horizontal and the inclined surface then can be determined using trigonometric functions. In this connection the "path length" is understood to refer to a path from the measuring point to the respective point on the inclined surface.

The measuring of path lengths from a measuring point and a target point and of the angle of the measuring paths to the horizontal can be made by commonly known measuring technology including commercially available laser and ultrasonic distance measuring devices. The invention thus broadens the measuring options and the user convenience of such a device by adding the appropriate evaluation function which, in turn, can be implemented in a manner which is known per se by resorting to trigonometric standard functions.

The angle can, for example, be determined based on the measured lengths and the measured angles based on the following condition or transformations thereof:

$$W10 = \beta + \arctan((L10 \cdot \sin(\beta - \alpha))/(L20 - L10 \cdot \cos(\beta - \alpha))).$$

A first embodiment of the measuring device according to the invention relates to a measuring device for determining an angle W10 between an inclined surface, in particular a roof or landscape surface, and the horizontal, including a means for carrying out individual distance measurements from a measuring point in a measuring plane, which is perpendicular to the inclined surface and the horizontal, by means of which a length L10 of a first path from the measuring point to a first point on the inclined surface, and a second length L20 of a second path from the measuring point to a second point on the inclined surface can be determined, a means for determining the angle $\alpha$, $\beta$ between the horizontal and the respective directions of the first and second paths, a memory device in which the measured length L10 of the first path and the angle $\alpha$ between the horizontal and the first path, and the measured length L20 and the angle $\beta$ between the horizontal and the second path can be stored, and an evaluation unit designed to determine the angle W10 based on the stored lengths L10, L20 and the associated angles $\alpha$, $\beta$ to the horizontal (H) using trigonometric functions and to output the same The memory device in the measuring device enables a stepwise process in a defined sequence of measuring steps, in that it stores intermediate results of the measuring steps and provides them to be used for the subsequent evaluation.

In a preferred embodiment of the measuring device for determining an angle W10 between an inclined surface and the horizontal the evaluation unit is configured to determine the angle W10 based on the stored lengths L10, L20 and the associated angles α, β to the horizontal based on the following condition or transformations thereof and to output the same:

$$W10=\beta+\arctan((L10\cdot\sin(\beta-\alpha))/(L20-L10\cdot\cos(\beta-\alpha))).$$

A second method according to the invention for determining an angle is a method for determining an angle W in a corner (inside corner) between a first wall surface and a second wall surface, in which individual distance measurements are carried out in a measuring plane, which is perpendicular to the first wall surface and the second wall surface, from a measuring point in the measuring plane, wherein a first length L1 is determined as a perpendicular or smallest distance between the measuring point and the first wall surface, a second length L2 is determined as a perpendicular or smallest distance between the measurement point and the second wall surface, and a third length L3 is determined as a distance between the measuring point and the corner (inside corner) between the first wall surface and the second wall surface, wherein the angle W is determined from the first length L1, the second length L2 and the third length L3 using trigonometric functions.

The method for determining an angle allows a user to indirectly determine the angle in a corner (inside corner) between two wall surfaces, which is located at a distance and difficult to access, easily and quickly, without having to be present in the immediate vicinity thereto. It suffices to determine three path lengths, from which the required angle between the wall surfaces is determined.

Here, too, it is possible to measure path lengths between a measuring point and a target point using generally known measuring techniques, such as commercially available laser or ultrasonic distance meters. As a result, the invention broadens the measuring options and the user convenience of such a device by adding the appropriate evaluation function which, in turn, can be implemented in a manner which is known per se by resorting to trigonometric standard functions.

The angle in the corner can be determined, for example, from the measured path lengths based on the following condition or transformations thereof.

$$W=\arcsin(L1/L3)+\arcsin(L2/L3).$$

In a preferred embodiment of this method, a minimum from a sequence of individual distance measurements is determined for the first length L1 and the second length L2, and a maximum from a sequence of individual distance measurements is determined for the third length L3, wherein the sequences of individual distance measurements are recorded each time a measuring angle from the measuring point in the measuring plane is passed over, and wherein the measuring angle passes over at least one region in which the respective length or lengths is or are assumed. For this purpose as well, the method resorts to measuring routines which are known per se for measuring "shortest" paths or perpendiculars from the measuring point to a path, or "longest" paths between the measuring point and a target point, in which a smallest measurement value (or a largest measurement value) is selected as the respective required shortest or longest path by pivoting the measuring device over a measuring or sought angle and conducting a serial measurement using a certain sampling rate.

In the method according to the invention for determining the angle W, the measuring angle preferably passes over at least one region in which the first length, the second length and the third length are assumed, wherein the first length L1 is determined as a first minimum, the second length L2 is determined as a second minimum, and the third length L3 is determined as a first maximum between the first and the second minima from the sequence of the serially conducted and buffered individual distance measurements within the measuring angle. Thus, a measuring angle is passed over in this method which includes all three essential paths and which is at least as large as the angle between the measuring paths L1 and L2, and typically slightly larger than this angle.

A second embodiment of the measuring device according to the invention relates to a measuring device for determining an angle W in a corner (inside corner) between a first wall surface and a second wall surface, and comprises a means for carrying out individual distance measurements from a measuring point in a measuring plane perpendicular to the first wall surface and the second wall surface, which can be used to determine a first length L1 as a perpendicular or smallest distance between the measuring point and the first wall surface, a second length L2 as a perpendicular or smallest distance between the measuring point and the second wall surface, and a third length L3 as a distance between the measuring point and the corner between the first wall surface and the second wall surface, a memory device for storing the ascertained first length L1, second length L2 and third length L3, and an evaluation unit, which is configured to determine the angle W based on the stored lengths using trigonometric functions and to output the same.

In an advantageous embodiment of the measuring device, the evaluation unit is configured to determine the angle W from the stored lengths L1, L2 and L3 based on the following condition or transformations thereof and to output the same:

$$W=\arcsin(L1/L3)+\arcsin(L2/L3).$$

In an advantageous embodiment of the measuring device, the means for carrying out individual distance measurements is designed to determine a minimum from a sequence of individual distance measurements for the first length L1 and the second length L2, and a maximum from a sequence of individual distance measurements for the third length L3, and is able to carry out the sequences of individual distance measurements each time a measuring angle is passed over from the measuring point in the measuring plane, wherein the measuring angle includes at least one region W3 or multiple regions X in which the respective lengths or lengths is or are assumed.

In a further advantageous embodiment of the measuring device, the means for carrying out individual distance measurements is configured to determine the first length L1 as the first minimum, the second length L2 as the second minimum, and the third length L3 as the first maximum between the first and the second minima from the sequence of the individual distance measurements when a measuring angle MW is passed over which includes at least the region W3 in which the first length L1, the second length L2 and the third length L3 are located.

In an advantageous embodiment, the measuring device is an electronic distance meter to be hand-held for the measurement, and in particular a laser or ultrasonic distance meter, which, in particular, includes a min/max function.

In an advantageous embodiment, the measuring device includes an attachment point for the attachment to a tripod and a function for setting a measuring reference.

In an advantageous embodiment, the measuring device can output the measurement result onto a display unit by visual representation and/or via a data exchange link to an external device.

DETAILED DESCRIPTION

The present invention will be described in detail hereafter with reference to FIGS. 1 and 2.

Figure 1:
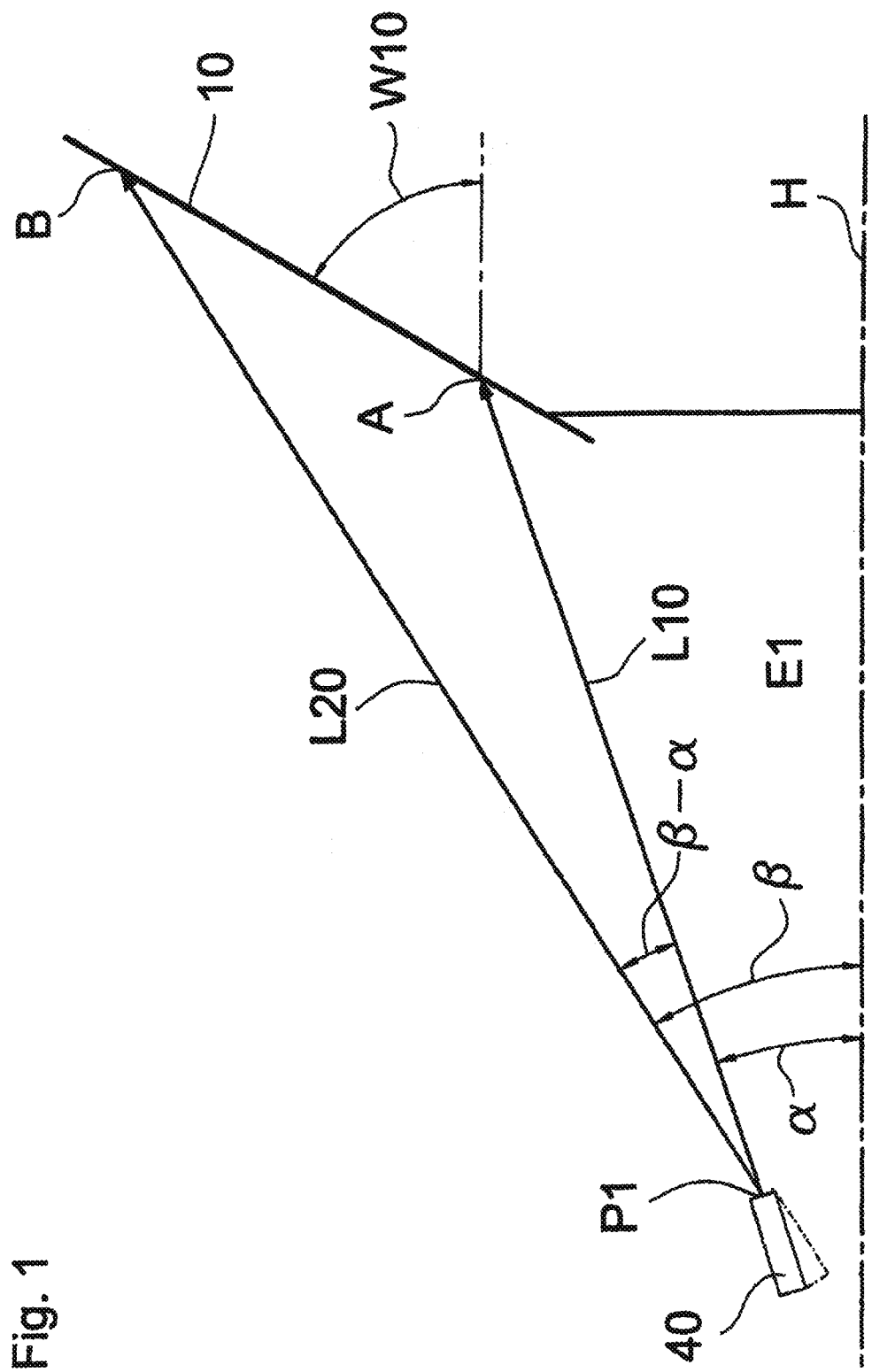
FIG. 1 shows a side view of a measuring system according to a first embodiment of the invention, in which an angle between an inclined surface and the horizontal is determined.

FIG. 1 shows a side view of a measuring system according to a first embodiment of the invention, in which an angle W10 between an inclined surface 10 and the horizontal is H determined. In the method, a measuring device 40 is used to measure, from a measuring point P1 in a measuring plane E1, a first length L10, which is a path length between the measuring point P1 and a first (target) point A on the inclined surface 10, and a second length L20, which is a path length between the measuring point P1 and a second (target) point B on the inclined surface 10.

The measuring plane E1 corresponds to the paper surface in FIG. 1 and is perpendicular to the inclined surface 10 and the horizontal H.

During the measurement of the lengths L10 and L20, the respective angles α and β between the direction of the path having the length L20, or the direction of the path having the length L10, and the horizontal H are also determined.

Based on the angles α and β thus measured and the associated lengths L10 and L20, it is possible, using trigonometric functions, such as the condition $$W10=\beta+\arctan((L10\cdot\sin(\beta-\alpha))/(L20-L10\cdot\cos(\beta-\alpha))).$$

to determine the angle W10 between an inclined surface 10 and the horizontal H.

L10 and L20 are variables to each of which a measured path length with respect to the two (target) points on the surface 10 are assigned, and α and β are variables to each of which the associated measured angle of the paths are assigned.

The determination of the angle W10 is not limited to this condition, and the angle W10 can also be determined from transformations of this condition, or using other conditions, such as:

$$W10=\arctan((\sin(\beta)\cdot L20-\sin(\alpha)\cdot L10)/(\cos(\beta)\cdot L20-\cos(\alpha)\cdot L10))$$

under the further condition that L20>L10 is met.

A measuring device 40 according to the invention for determining the angle W10 between the inclined surface 10 and the horizontal H, using the above-described method, for this purpose includes a means for carrying out individual distance measurements, and a means for determining an angle of measuring directions or measuring paths.

Preferably, the means for carrying out individual distance measurements is a laser unit, which is able to measure a propagation time of a laser pulse of a laser beam, emitted from a measuring point P1 to the target point, between emission and reception and, therefrom, is able to determine the length of the path between the measuring point P1 and the target point. As an alternative or in addition, the laser unit could also determine the path length from another parameter, such as by way of triangulation and/or a phase position, and in particular by way of a signal modulated onto the laser beam, as is described in DE 10 2011 005 277 A1, for example.

The means for determining the angles α and β between the respective direction of the measuring paths L10 and L20 from the measuring point P1 to the first target point A and to the second target point and the horizontal H can, for example, be an electronic inclination sensor or a position detection unit, which is designed to detect an orientation of the measuring device 40 with respect to the horizontal and to assign the result of the respective length measurement, whereby essentially a vector to the target point is determined. For example, the inclination sensor or the position detection unit can detect the orientation of the laser unit, or of the entire measuring device, relative to gravity during the respective length measurement, and determine the angles α and β therefrom.

The measuring device 40 furthermore comprises a memory device in which the measured paths L10 and L20 and the assigned angles α and β can be stored. An evaluation unit is provided and designed to determine the required angle W10 based on the stored lengths L10 and L10 and the associated angles α and β, using the above-described conditions, in that the evaluation unit assigns the stored measurement values to the variables L10 and L20 in the condition. If this is necessary for the condition that is used, the evaluation unit may assign the measured length of the two measurement values which has the smaller magnitude to the variable L10, so that L10<L20 applies.

Moreover, the measuring device 40 comprises an output unit, which is able to represent at least the calculated angle of the inclination of the surface and, if necessary, the measured lengths and angles to the target points on a display, for example. As an alternative or in addition, the output unit can transmit the ascertained information by wire or wirelessly, for example using wireless protocols such as Bluetooth or the like, to an external device.

So as to determine the angle W10 as an inclination of a remote surface 10 with respect to the horizontal H, a user thus only has to determine the distance between the measuring point P1 and two arbitrary target points A and B on the surface 10, and the respective angles between the paths to the target points and the horizontal which are present during the measurements. Within the scope of a program sequence, the measuring device can incrementally instruct the user to carry out the measurements and store the measurement values, which is to say the vectors composed of the distance and angle, for the subsequent evaluation. Within the scope of the evaluation, the stored data is then assigned, as described above, to the variables of the condition using trigonometric functions, and the angle W10 between the inclined surface 10 and the horizontal H is calculated therefrom and output as described above.

The measuring device 40 can include an attachment point for the attachment to a tripod, so as to be able to carry out the measurements of the distance and angle to the two target points in the measuring plane with greater accuracy by a defined mechanical guidance of the movement in the measuring plane, which may be integrated in the measuring device or in the tripod. For this purpose, the measuring device 40 can include a function for setting a measuring reference, whereby the distance between the attachment point (pivot point) to the tripod and the measuring point of the device can be taken into consideration and compensated for.

The measuring device 40 is preferably a hand-held distance meter, and in particular a laser or ultrasonic distance meter, including an integrated goniometer or inclination sensor.

Figure 2:
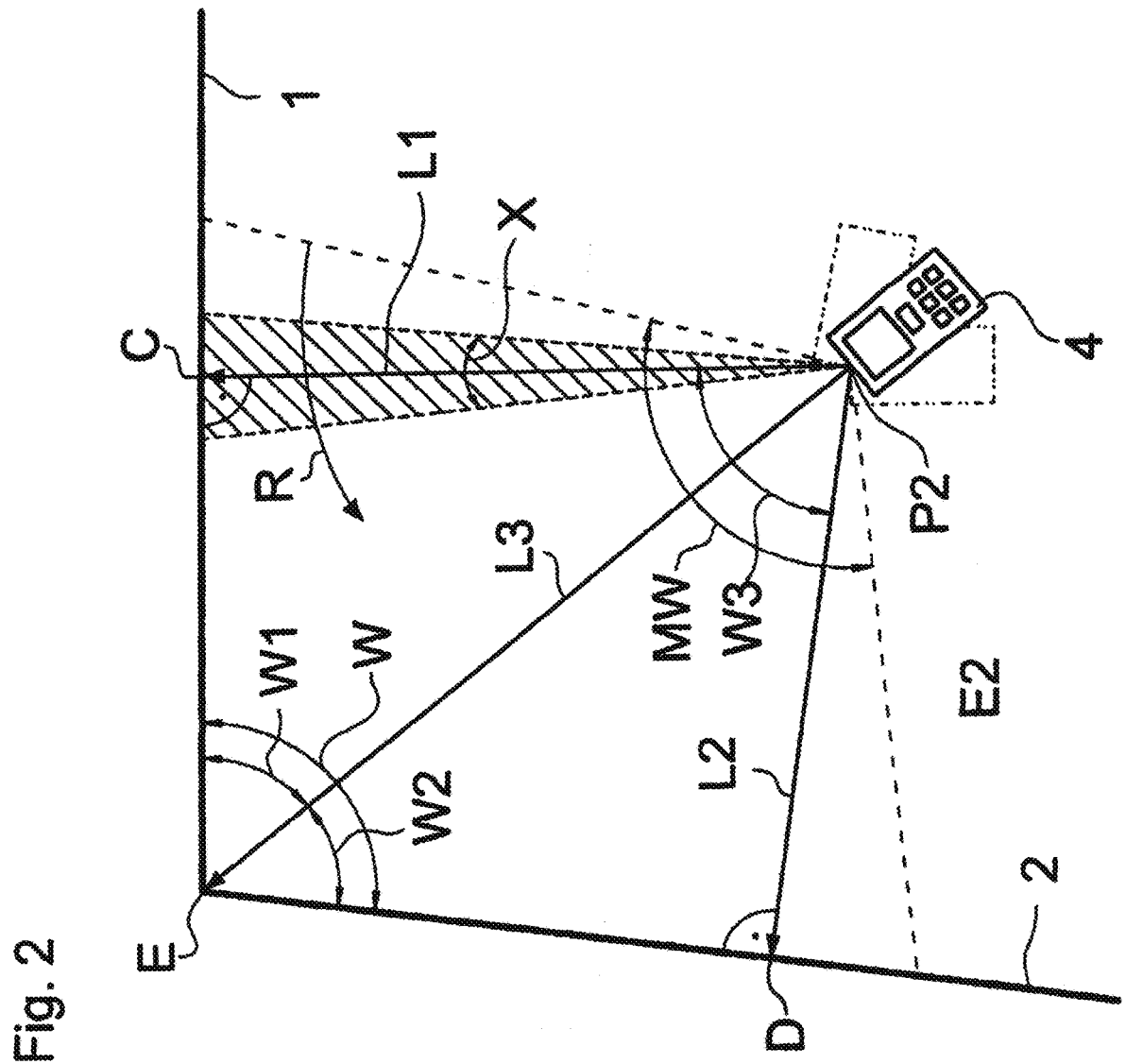
FIG. 2 shows a top view onto a measuring system according to a second embodiment of the invention, in which an angle in a corner between two intersecting wall surfaces is determined.

FIG. 2 shows a top view onto a measuring system according to a second embodiment of the invention, in which an angle W between a first wall surface 1 and a second wall surface 2, which form a corner (inside corner), is determined. From a measuring point P2 in a measuring plane E2 that is perpendicular to the two wall surfaces 1, 2, a minimum distance from the first wall surface 1 as a perpendicular to the (target) point C is determined as a first length L1, a minimum distance from the second wall surface 2 as a perpendicular to the (target) point D is determined as a second length L2, and a distance from the intersecting point of the first wall surface 1 with the second wall surface 2 in the corner at the (target) point E is determined as a third length L3 by way of a measuring device 4. The angle W to be determined faces the measuring point P2, and the measuring plane E2 in which the measuring point P2 and the target points C, D and E are located corresponds to the paper surface in FIG. 2.

In an advantageous embodiment, the lengths L1, L2 and L3 can be determined using what is known as a "min/max function" of the measuring device 4 when a measuring angle MW in the measuring plane E2 is passed over, which starts at a location of the first wall surface 1 in front of the (target) point C and extends continuously to a location on the second wall surface 2 behind the (target) point D, enclosing the corner point E. The lengths can also be determined when individual, mutually independent and consecutively measured angular regions are passed over, in which the respective lengths L1, L2 and L3 or the target points C, D and E are assumed, wherein at least one region X has to be passed over during each individual measurement, which is certain to include the required (target) point (the region X is shown for the point C in FIG. 2 only by way of example). The minimum size of the region X depends on the measuring speed or the sampling rate of the measuring device that is used. The measurement values of the lengths L1, L2 and L3 are stored for the subsequent evaluation. It is also possible, of course, to combine an individual measurement with a measurement of two paths.

From the stored lengths L1, L2 and L3 determined either from the continuous measuring angle MW or the sub-measuring angles, initially a first sub-angle W1 of the angle W is determined from the trigonometric condition $$W1 = \arcsin(L1/L3)$$

or from transformations thereof.

A second sub-angle W2 of the angle W is determined in the same manner from the trigonometric condition $$W2 = \arcsin(L2/L3)$$

or from transformations thereof.

By way of addition, the angle W between the two wall surfaces in the corner is determined from the two sub-angles W1 and W2.

The present invention is not limited to this procedure, and the sub-angles W1 and W2 can also be determined, for example, by applying trigonometric conditions and subsequently using the angle sum theorem. For example, the first sub-angle W1 can also be determined from the condition $$W1 = 90 - \arccos(L1/L3)$$

or from transformations thereof, and the second sub-angle W2 of the angle W can be determined from the condition $$W2 = 90 - \arccos(L2/L3)$$

or from transformations thereof.

In summary, the angle W can thus be determined in the method according to the invention from the condition $$W = \arcsin(L1/L3) + \arcsin(L2/L3)$$

or from transformations thereof.

The measurement values of the paths to the above-described target points are each assigned to the variables L1, L2 and L3 in the conditions.

A measuring device 4 for determining the angle W, applying the principle of the method according to the second embodiment of the invention, comprises a means for carrying out individual distance measurements, which is configured to determine a distance or a path length, referred to hereafter as length, between the measuring point P2 and the target points C, D and E on the wall surfaces in the measuring plane E2 by passing over, as described above, a measuring angle MW across all three target points or multiple sub-regions X of the measuring angle MW including the respective target points. The movement of the measuring device in the measuring plane required for this purpose can be manually guided or motor-controlled and, in principle, a similar measuring device as in the first embodiment, which is to say a laser or ultrasonic distance measuring device, can be used, wherein in contrast no angle measurement of the respective measuring paths to the horizontal is required since all three distance measurements are carried out within the measuring plane E2.

For example, when the measuring angle MW is continuously passed over in a direction R (see FIG. 2) and the distances are measured serially using a certain sampling rate for the consecutive measurement values, first a minimum distance occurs, thereafter a maximum distance L3, and then another minimum distance L2. The measuring device 4 is able to detect such a sequence of minimum and maximum values and assign the measurement values to the lengths L1, L2, L3 and store these in the memory device. The measurement can also be carried out in the reverse direction of R.

When individual measurements of the respective distances from the points C, D and E are carried out by passing over individual measuring angles X in which the respective target point is assumed, the order can be predetermined and predefined by a program sequence using appropriate menu navigation. The measuring device, however, can also be designed to select the two minimum values and the maximum value from the series of stored measurement values of a measuring cycle, and assign these to the corresponding variables of the trigonometric condition in the evaluation unit.

The measuring device 4 comprises a memory device for storing the measured distances or lengths L1, L2 and L3, and an evaluation unit, which is designed to determine the required angle W based on the stored lengths L1, L2 and L3 using trigonometric functions, as described above.

As in the first embodiment, the measuring device can query the required measurements using a program sequence of a measuring program and thereby instruct a user to carry out the necessary measurements. It is also possible, as in the first embodiment, to output the measurement result and to take a deviation between the measuring point and the pivot or attachment point to a tripod into consideration for the measurement by setting a measuring reference. The measuring device or the tripod can again comprise a mechanical pivot guide, so as to be able to carry out the measurements of the paths to the three target points in the measuring plane within the measuring angle with greater accuracy by a defined movement in the measuring plane. The measuring device 4, however, can also be a hand-held distance meter, and in particular a laser or ultrasonic distance meter.

The measuring device can furthermore comprise an auxiliary unit for checking the orientation of the measuring device in the horizontal, for example in the form of a spirit level or an electronic inclination sensor.

Finally, the measuring device can be composed of multiple units, wherein the actual measuring unit (laser or ultrasonic measuring unit) may be separate from the evaluation unit including a memory and/or a display, wherein the units are configured for data communication among one another by wire or wirelessly in the manner which is known per se. A conceivable embodiment here is one in which the evaluation unit, including the memory and display, is implemented as an application on an electronic universal device (smart phone, PC and the like), and the measuring unit is implemented separately therefrom as a dedicated unit, which exchanges the data with the universal device via one of the common communication protocols.

The invention claimed is:

1. A method for determining an angle W in a corner between a first wall surface (1) and a second wall surface (2), in which individual distance measurements are carried out in a measuring plane (E2), which is perpendicular to the first wall surface (1) and the second wall surface (2), from a measuring point (P2) in the measuring plane (E2), wherein a first length L1 is determined as a smallest distance between the measuring point (P2) and the first wall surface (1), a second length L2 is determined as a smallest distance between the measuring point (P2) and the second wall surface (2), and a third length L3 is determined as a distance between the measuring point (P2) and the corner between the first wall surface (1) and the second wall surface (2) in the measuring plane (E2), and wherein the angle W is determined from the first length L1, the second length L2 and the third length L3 using trigonometric functions.

2. The method for determining an angle W according to claim 1, wherein the angle W is determined based on the following condition or transformations thereof:

$$W=\arcsin(L1/L3)+\arcsin(L2/L3).$$

3. The method for determining an angle W according to claim 1, wherein a minimum from a sequence of individual distance measurements is determined for the first length L1 and the second length L2, and a maximum from a sequence of individual distance measurements is determined for the third length L3, wherein the sequences of individual distance measurements are recorded when a measuring angle (MW) is passed over from the measuring point (P2) in the measuring plane, and wherein the measuring angle (MW) passes over at least one region (X) in which the respective length or lengths is or are assumed.

4. The method for determining an angle W according to claim 3, wherein the measuring angle (MW) passes over at least one region (W3) in which the first length L1, the second length L2 and the third length L3 are assumed, and wherein the first length L1 is determined as the first minimum, the second length L2 as the second minimum, and the third length L3 as the first maximum between the first and the second minima from the sequence of the individual distance measurements.

5. A measuring device (4) for determining an angle W in a corner between a first wall surface (1) and a second wall surface (2), comprising:

a means configured to carry out individual distance measurements from a measuring point (P2) in a measuring plane (E2) that is perpendicular to the first wall surface (1) and the second wall surface (2), which can be used to determine a first length L1 as a smallest distance between the measurement point (P2) and the first wall surface (1), a second length L2 as a smallest distance between the measurement point (P2) and the second wall surface (2), and a third length L3 as a distance between the measuring point (P2) and the corner between the first wall surface (1) and the second wall surface (2);

a memory device configured to store the ascertained first length L1, second length L2 and third length L3; and an evaluation unit, which is configured to determine the angle W based on the stored lengths L1, L2 and L3 using trigonometric functions and to output the same.

6. The measuring device (4) according to claim 5, wherein the evaluation unit is configured to determine the angle W based on the stored lengths L1, L2 and L3 using the following condition or transformations thereof and to output the same:

$$W=\arcsin(L1/L3)+\arcsin(L2/L3).$$

7. The measuring device (4) according to claim 5, wherein the means for carrying out individual distance measurements is configured to determine a respective minimum from a sequence of individual distance measurements for the first length L1 and the second length L2, and a maximum from a sequence of individual distance measurements for the third length L3, and to carry out the sequences of individual distance measurements from the measuring point (P2) in the measuring plane (E2) each time a measuring angle (MW) is passed over, wherein the measuring angle (MW) includes at least one region (X) in which the respective length or lengths is or are assumed.

8. The measuring device (4) according to claim 5, wherein the means for carrying out individual distance measurements is configured to determine the first length L1 as a first minimum, the second length L2 as a second minimum, and the third length L3 as a first maximum between the first and the second minima from the sequence of the individual distance measurements when a measuring angle (MW) is passed over, in which the first length L1, the second length L2 and the third length L3 are assumed.

9. The measuring device (4) according to claim 5, wherein the measuring device (4) is an electronic distance meter to be hand-held for the measurement, and in particular a laser or ultrasonic distance meter, which, in particular, includes a min/max function.

10. The measuring device (4) according to claim 9, wherein the measuring device (4) includes an attachment point for the attachment to a tripod and a function for setting a measuring reference.

11. The measuring device (4) according to claim 5, wherein the measuring device (4) can output the measurement result onto a display unit by visual representation and/or via a data exchange link to an external device.

12. The method for determining an angle W according to claim 2, wherein a minimum from a sequence of individual distance measurements is determined for the first length L1 and the second length L2, and a maximum from a sequence of individual distance measurements is determined for the third length L3, wherein the sequences of individual distance measurements are recorded when a measuring angle (MW) is passed over from the measuring point (P2) in the measuring plane, and wherein the measuring angle (MW) passes over at least one region (X) in which the respective length or lengths is or are assumed.

13. The measuring device (4) according to claim 6, wherein the means for carrying out individual distance measurements is configured to determine a respective minimum from a sequence of individual distance measurements for the first length L1 and the second length L2, and a maximum from a sequence of individual distance measurements for the third length L3, and to carry out the sequences of individual distance measurements from the measuring point (P2) in the measuring plane (E2) each time a measuring angle (MW) is passed over, wherein the measuring angle (MW) includes at least one region (X) in which the respective length or lengths is or are assumed.

14. The measuring device (4) according to claim 6, wherein the means for carrying out individual distance measurements is configured to determine the first length L1 as a first minimum, the second length L2 as a second minimum, and the third length L3 as a first maximum between the first and the second minima from the sequence of the individual distance measurements when a measuring angle (MW) is passed over, in which the first length L1, the second length L2 and the third length L3 are assumed.

15. The measuring device (4) according to claim 7, wherein the means for carrying out individual distance measurements is configured to determine the first length L1 as a first minimum, the second length L2 as a second minimum, and the third length L3 as a first maximum between the first and the second minima from the sequence of the individual distance measurements when a measuring angle (MW) is passed over, in which the first length L1, the second length L2 and the third length L3 are assumed.

16. The measuring device (4) according to claim 8, wherein the measuring device (4) is an electronic distance meter to be hand-held for the measurement, and in particular a laser or ultrasonic distance meter, which, in particular, includes a min/max function.

17. A method for determining an angle W in a corner between a first wall surface (1) and a second wall surface (2), the method comprising:

measuring point (P2) in a measuring plane (E2), utilizing a distance meter for individual distance measurements, wherein the measuring point is perpendicular to the first wall surface (1) and the second wall surface (2) which can be used to determine a first length L1 as a smallest distance between the measurement point (P2) and the first wall surface (1), a second length L2 as a smallest distance between the measurement point (P2) and the second wall surface (2), and a third length L3 as a distance between the measuring point (P2) and the corner between the first wall surface (1) and the second wall surface (2), wherein the distance meter is configured to determine a respective minimum from a sequence of individual distance measurements for the first length L1 and the second length L2, and a maximum from a sequence of individual distance measurements for the third length L3;

storing the ascertained first length L1, second length L2 and third length L3 in a memory device; and utilizing trigonometric functions comprising an evaluation unit, to determine the angle W based on the stored lengths L1, L2 and L3 and outputting the same.

18. The method according to claim 17, comprising utilizing the distance meter for sequencing individual distance measurements from the measuring point (P2) in the measuring plane (E2) each time a measuring angle (MW) is passed over, wherein the measuring angle (MW) includes at least one region (X) in which the respective length or lengths is or are assumed.

19. The method according to claim 17, comprising configuring the evaluation unit to determine the angle W based on the stored lengths L1, L2 and L3 using the following condition or transformations thereof and to output the same:

$$W=\arcsin(L1/L3)+\arcsin(L2/L3).$$

20. The method according to claim 17, comprising configuring the distance meter to take individual distance measurements to determine the first length L1 as a first minimum, the second length L2 as a second minimum, and the third length L3 as a first maximum between the first minimum and the second minimum from the sequence of the individual distance measurements when a measuring angle (MW) is passed over, in which the first length L1, the second length L2 and the third length L3 are assumed.

* * * * *